US012139126B2

(12) United States Patent
Hong (10) Patent No.: US 12,139,126 B2
(45) Date of Patent: Nov. 12, 2024

(54) BRAKE PEDAL MOVEMENT DEVICE (71) Applicant: HL MANDO CORPORATION, Pyeongtaek-si (KR)

(72) Inventor: Kwangseok Hong, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 29 days.

(21) Appl. No.: 17/802,091

(22) PCT Filed: Feb. 25, 2021

(86) PCT No.: PCT/KR2021/002412
§ 371 (c)(1),
(2) Date: Aug. 24, 2022

(87) PCT Pub. No.: WO2021/172915
PCT Pub. Date: Sep. 2, 2021

(65) Prior Publication Data
US 2023/0077416 A1 Mar. 16, 2023

(30) Foreign Application Priority Data
Feb. 25, 2020 (KR) .......................... 10-2020-0022668

(51) Int. Cl.
*B60T 8/40* (2006.01)
*B60T 7/04* (2006.01)
(Continued)

(52) U.S. Cl.
CPC ............ *B60T 8/4086* (2013.01); *B60T 7/042* (2013.01); *B60T 7/06* (2013.01); *B60T 7/12* (2013.01); *B60T 8/409* (2013.01); *B60T 2270/60* (2013.01)

(58) Field of Classification Search
CPC .................................................. B60T 8/4086
See application file for complete search history.

(56) References Cited

U.S. PATENT DOCUMENTS 5,094,079 A * 3/1992 Leigh-Monstevens ...................... B60T 13/66
60/545

FOREIGN PATENT DOCUMENTS

CN 104228791 A * 12/2014
CN 109204270 A 1/2019
(Continued)

OTHER PUBLICATIONS

International Search Report (PCT/ISA/210) issued in PCT Application No. PCT/KR2021/002412 dated Jun. 8, 2021 with English Translation.
(Continued)

*Primary Examiner* — Vicky A Johnson
(74) *Attorney, Agent, or Firm* — Harvest IP Law, LLP (57) ABSTRACT Disclosed is an apparatus for moving a brake pedal. The apparatus for moving a brake pedal according to the disclosure includes a pedal simulator providing a reaction force according to a pedal effort of the brake pedal and having one side connected to the brake pedal through an input rod, a screw fixed to the other side of the pedal simulator and having a first screw thread formed on an outer circumferential surface thereof, an anti-rotation portion configured to prevent rotation of at least one of the pedal simulator and the screw, and an actuator configured to provide power, wherein the first screw thread is connected to the actuator to receive a rotational force, and the screw converts the rotational force into a translational motion by the anti-rotation portion, thereby generating the translational motion of the pedal simulator and the brake pedal fixed or connected to the screw.

16 Claims, 11 Drawing Sheets (51) Int. Cl.
*B60T 7/06* (2006.01)
*B60T 7/12* (2006.01)

(56) References Cited

FOREIGN PATENT DOCUMENTS

| | | |
|---|---|---|
| JP | 2008-254586 A | 10/2008 |
| KR | 10-2010-0067242 A | 6/2010 |
| KR | 10-2010-0098847 A | 9/2010 |
| KR | 10-2013-0088793 A | 8/2013 |

OTHER PUBLICATIONS

Written Opinion (PCT/ISA/237) issued in PCT Application No. PCT/KR2021/002412 dated Jun. 8, 2021.

* cited by examiner

BRAKE PEDAL MOVEMENT DEVICE

CROSS-REFERENCE OF RELATED APPLICATIONS

This application is the U.S. National Phase under 35 U.S.C. § 371 of International Patent Application No. PCT/KR2021/002412, filed on Feb. 25, 2021, which claims the benefit of Korean Patent Application No. 10-2020-0022668, filed on Feb. 25, 2020, the entire disclosures of each are incorporated by reference herein.

TECHNICAL FIELD

The present disclosure relates to an apparatus for moving a brake pedal, and more particularly, to an apparatus for moving a brake pedal capable of moving the brake pedal forward and backward according to an operating condition of a vehicle.

BACKGROUND ART

Generally, a vehicle is essentially equipped with a brake system for performing braking, and various types of brake systems have been proposed for a safety of a driver and passenger.

Conventional brake systems mainly use a method of supplying hydraulic pressure required for braking to a wheel cylinder using a mechanically connected booster when a driver depresses a brake pedal. However, nowadays, to implement various braking functions by actively responding to an operating environment of a vehicle, development of an electronic brake system has been ongoing. For example, electronic brake system receives a driver's intention to brake as an electrical signal from a pedal displacement sensor for detecting the displacement of the brake pedal when a driver depresses a brake pedal and based on the electric signal operates a hydraulic pressure supply device to supply a hydraulic pressure required for braking to a wheel cylinder.

Furthermore, an electronic brake system provides a pedal feel by installing a separate pedal simulator in order to provide the pedal feel to a driver according to a pedal effort of a brake pedal during braking.

In such an electronic brake system, braking of a vehicle is directly or indirectly controlled according to a brake effort for a brake pedal of a driver. Accordingly, the brake pedal remains to be exposed toward a driver in a passenger space of the vehicle so that the driver may perform the operation thereof at any time.

On the other hand, recently, an autonomous driving system, which identifies surrounding information from a camera, a radar, or a sensor mounted on a vehicle and based on the surrounding information allows a vehicle to autonomously run and stop without the intervention of a driver, has been developed. When a vehicle autonomously drives, the vehicle is automatically performed autonomous driving based on the detected information regardless of whether a driver operates a brake pedal. In this case, if the brake pedal remains to be exposed toward a passenger space of the vehicle, a driver may feel uncomfortable, and moreover there is also a risk of injury to a driver's leg by the exposed brake pedal in the case of a vehicle accident during autonomous driving.

Furthermore, because a pedal simulator is separately provided and installed, the volume of the electronic brake system increases and also installation thereof is difficult.

DISCLOSURE

Technical Problem

Various aspects of the present disclosure is to provide an apparatus for moving a brake pedal capable of adjusting a position of the brake pedal according to an operating situation of a vehicle.

Various aspects of the present disclosure is to provide an apparatus for moving a brake pedal capable of improving comfortable habitability of a driver by accommodating the brake pedal during autonomous driving of a vehicle.

Various aspects of the present disclosure is to provide an apparatus for moving a brake pedal capable of improving operability of a vehicle by exposing the brake pedal toward a driver when general driving of the vehicle is performed.

Various aspects of the present disclosure is to provide an apparatus for moving a brake pedal capable of easily implementing forward and backward movement of the brake pedal with a simple structure.

Various aspects of the present disclosure is to provide an apparatus for moving a brake pedal capable of minimizing an injury to a driver in the case of a vehicle accident.

Various aspects of the present disclosure is to provide an apparatus for moving a brake pedal capable of improving assemblability of a pedal simulator that provides a pedal feel to a driver.

Technical Solution

In accordance with an aspect of the present disclosure, an apparatus for moving a brake pedal includes a pedal simulator providing a reaction force according to a pedal effort of the brake pedal and having one side connected to the brake pedal through an input rod; a screw fixed to the other side of the pedal simulator and having a first screw thread formed on an outer circumferential surface thereof; an anti-rotation portion configured to prevent rotation of at least one of the pedal simulator and the screw; and an actuator configured to provide power; wherein the first screw thread is connected to the actuator to receive a rotational force, and the screw converts the rotational force into a translational motion by the anti-rotation portion, thereby generating the translational motion of the pedal simulator and the brake pedal fixed or connected to the screw.

The pedal simulator may further includes a reaction piston connected to the input rod, a cylinder body in which a bore is formed on one side and the screw is fixed on the other side thereof, the bore in which the reaction force piston is accommodated to move forward and backward.

The anti-rotation portion may further include an anti-rotation body fixed to the cylinder body, at least one anti-rotation protrusion protruding from the anti-rotation body, and at least one anti-rotation groove that is recessed in a fixedly installed structure to allow the anti-rotation protrusion to be introduced.

The anti-rotation body may be provided in a cylindrical shape and fixed to an outer circumferential surface of the cylinder body, and the anti-rotation protrusion may be provided on an outer circumferential surface of the anti-rotation body.

The anti-rotation groove may be formed to extend along a translational movement direction.

The actuator may further include a motor configured to generate power, and a gear assembly provided between a rotation shaft of the motor and the screw.

The gear assembly may further include a first gear coupled to the rotation shaft of the motor, and a second gear meshed with the first gear to transmit a rotational force to the screw.

The second gear may be provided coaxially with the screw, and include a second screw thread meshing with the first screw thread on an inner circumferential surface thereof.

The first gear may be provided as a worm gear, and the second gear may be provided as a worm wheel gear.

The first gear may include first gear teeth on an outer circumferential surface thereof, and the second gear may include second gear teeth meshing with the first gear teeth on an outer circumferential surface thereof.

The apparatus for moving the brake pedal may further include a housing having an accommodation space therein and fixed to a dash panel of a vehicle, wherein the anti-rotation groove is recessed in the housing.

The housing may further include a cylindrical body portion through which opposite sides thereof are penetrated so that the pedal simulator moves forward and backward in a longitudinal direction in the accommodation space, and a mounting portion extending radially from one side of an outer circumferential surface of the body portion and fixed to the dash panel.

The apparatus for moving the brake pedal may further include an actuator housing coupled to the other side of the body portion, wherein the actuator housing includes a first housing accommodating the gear assembly and provided with a gear accommodating portion communicating with the accommodation space, a second housing accommodating the motor and coupled to the first housing, and a cover coupled to the first housing and sealing the gear accommodating portion.

The cover may include a receiving portion formed in an axial direction to receive at least a portion of the screw during translation of the screw.

The actuator may be configured to be automatically controlled by an electronic control unit of a vehicle, or be controlled by receiving an operation signal from a driver.

Advantageous Effects

Various embodiments of present disclosure may provide an apparatus for moving a brake pedal capable of adjusting a position of the brake pedal according to an operating situation of a vehicle.

Various embodiments of present disclosure may provide an apparatus for moving a brake pedal capable of improving comfortable habitability of a driver by accommodating the brake pedal during autonomous driving of a vehicle.

Various embodiments of present disclosure may provide an apparatus for moving a brake pedal capable of improving operability of a vehicle by exposing the brake pedal toward a driver when general driving of the vehicle is performed.

Various embodiments of present disclosure may provide an apparatus for moving a brake pedal capable of easily implementing forward and backward movement of the brake pedal with a simple structure.

Various embodiments of present disclosure may provide an apparatus for moving a brake pedal capable of minimizing an injury to a driver in the case of a vehicle accident.

Various embodiments of present disclosure may provide an apparatus for moving a brake pedal capable of improving assemblability of a pedal simulator that provides a pedal feel to a driver.

DESCRIPTION OF DRAWINGS

These and/or other aspects of the disclosure will become apparent and more readily appreciated from the following description of the embodiments, taken in conjunction with the accompanying drawings of which.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
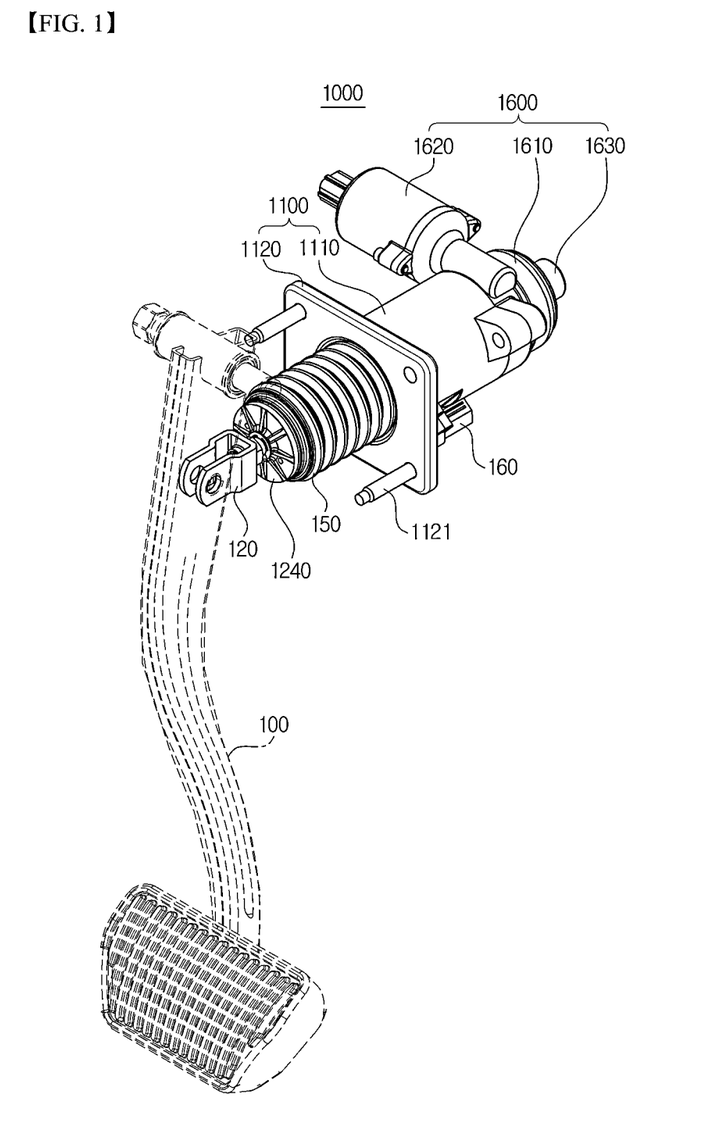
FIG. 1 is a perspective view illustrating an apparatus for moving a brake pedal according to an exemplary embodiment of the present disclosure.
Figure 2:
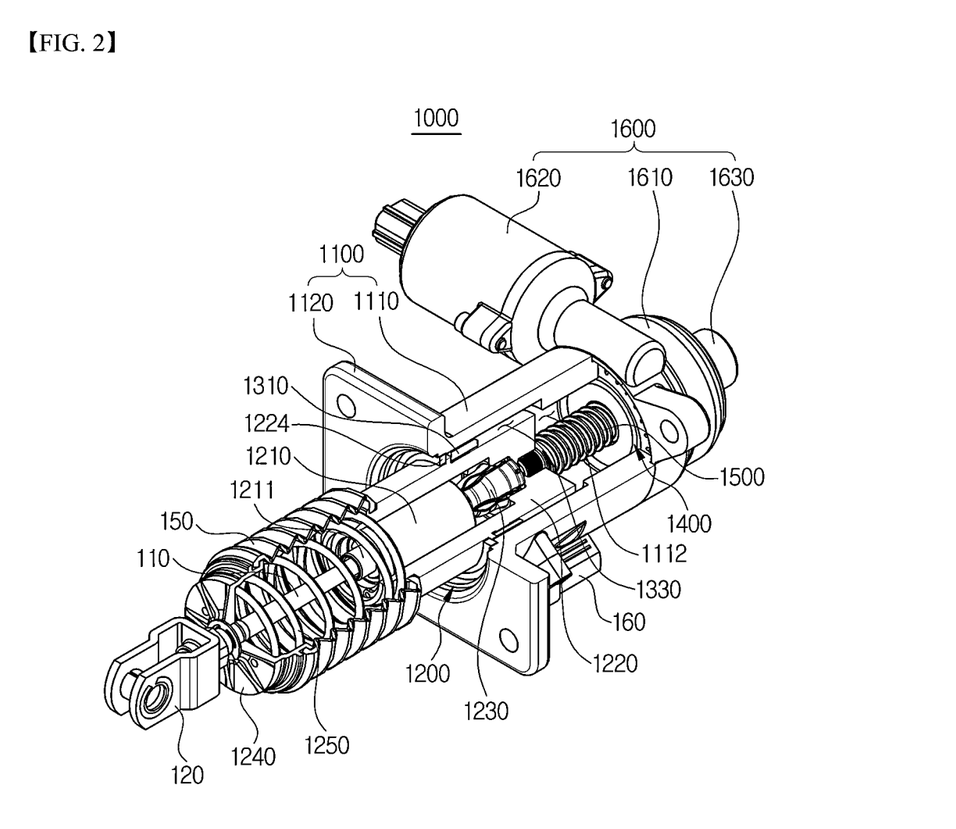
FIG. 2 is a partially-cut perspective view illustrating the apparatus for moving a brake pedal according to an exemplary embodiment of the present disclosure.
Figure 3:
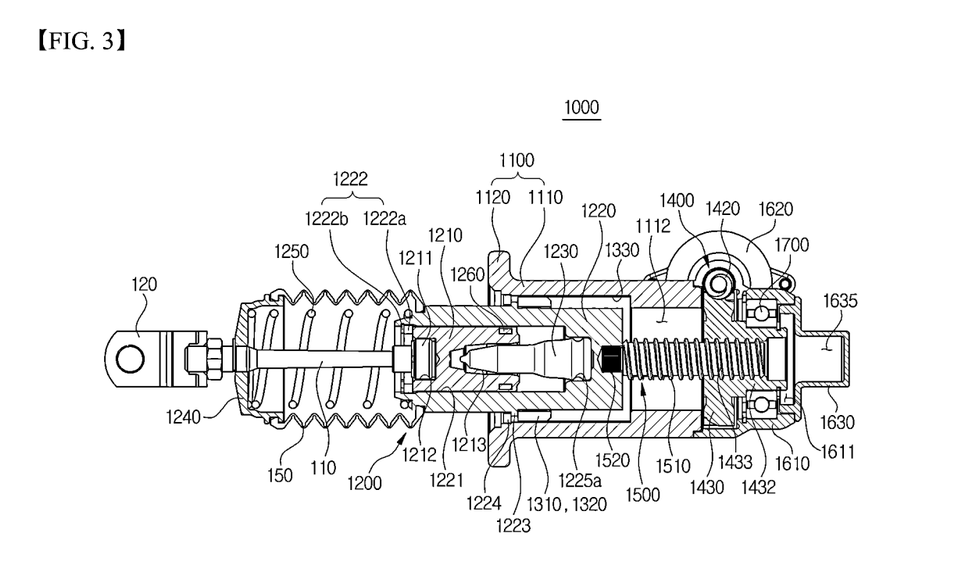
FIG. 3 is a side cross-sectional view illustrating the apparatus for moving a brake pedal according to an exemplary embodiment of the present disclosure.

FIG. 1 is a perspective view illustrating an apparatus for moving a brake pedal according to an exemplary embodiment of the present disclosure, FIG. 2 is a partially-cut perspective view illustrating an apparatus for moving a brake pedal according to an exemplary embodiment of the present disclosure, and FIG. 3 is a side cross-sectional view illustrating an apparatus for moving a brake pedal according to an exemplary embodiment of the present disclosure.

An apparatus for moving a brake pedal 1000 according to an exemplary embodiment may move a brake pedal (see 100 in FIG. 1) so that comfortable habitability of a driver and operability of a vehicle may be improved depending on an operating situation of the vehicle. In particular, when the vehicle autonomously drives, braking of the vehicle is automatically implemented, so that a driver's operation for the brake pedal 100 is unnecessary. Accordingly, the apparatus for moving the brake pedal 1000 according to an exemplary embodiment moves the brake pedal 100 forward (a right direction based on FIG. 3) so as to provide a comfortable habitability to a driver to receive the brake pedal from a passenger space of the vehicle. Conversely, when the vehicle is driven and braked by a driver, the apparatus for moving the brake pedal 1000 according to an exemplary embodiment moves the brake pedal 100 backward (a left direction based on FIG. 3) so that a driver may easily operate the brake pedal 100, thereby exposing the brake pedal 100 toward the passenger space of the vehicle. Furthermore, a position at which the brake pedal 100 is easily manipulated may vary depending on a driver's body size, and a driver may require comfortable habitability even when the vehicle is stopped, so the apparatus for moving the brake pedal 1000 according to an exemplary embodiment may adjust the brake pedal 100 to a suitable position.

Referring to FIGS. 1 to 3, the apparatus for moving the brake pedal 1000 according to an exemplary embodiment of the present disclosure may include an input rod 110 provided between the brake pedal 100 and s pedal simulator 1200 and connecting the brake pedal 100 to the pedal simulator 1200, a housing 1100 fixed to a dash panel (not shown) of the vehicle, the pedal simulator 1200 provided in the housing 1100 to provide a reaction force according to a pedal effort of the brake pedal 100, an anti-rotation portion 1300 that prevents a rotation of at least one of the pedal simulator 1200 and a screw 1500, an actuator 1400 that provides power for the movement of the brake pedal 100, the screw 1500 that linearly moves by receiving the power from the actuator 1400, and an actuator housing 1600 that accommodates the actuator 1400.

The brake pedal 100 (as well-known configuration, it is shown only in FIG. 1) is provided on a passenger space and may be pivotally connected to the input rod 110 through a clevis 120. At this time, the vehicle is divided into an engine room and a passenger space of the vehicle by the dash panel (not shown). The input rod 110 may be connected to a reaction force piston 1210 of the pedal simulator 1200, which will be described later. The brake pedal 100 may generate a displacement by pressing the reaction force piston 1210 according to the pedal effort of a driver, and thus may receive the reaction force therefrom. Furthermore, when the brake pedal 100 is operated according to a driver's intention to brake, the apparatus for moving the brake pedal 1000 may be operated independently. In other words, the electronic control unit (not shown) measures the displacement of the reaction force piston 1210 pressed according to the pedal effort of the brake pedal 100 through a sensor 160 to receive a driver's intention to brake as an electrical signal and then, based on the electrical signal, operates a hydraulic pressure supply device (not shown) to supply hydraulic pressure required for braking to a wheel cylinder. Furthermore, when the brake pedal 100 is folded in a forward direction by the apparatus for moving the brake pedal 1000, the brake pedal 100 may be accommodated in the passenger space by interlocking with the screw 1500 to be described later. A moving state of the brake pedal 100 will be described again below.

One end of the input rod 110 is connected to the brake pedal 100, and the other end thereof is coupled to a plunger 1211 to be connected to the reaction force piston 1210. At this time, the plunger 1211 is installed to be press-fitted to the reaction force piston 1210. Furthermore, the plunger 1211 serves to convert a curved motion of the brake pedal 100 into a linear motion. Accordingly, by fixing a rotation point of the input rod 110 in the plunger 1211, the curved motion of the input rod 110 according to the pedal effort of the brake pedal 100 is converted into the linear motion. Furthermore, because the input rod 110 is connected to the reaction force piston 1210 through the plunger 1211, the input rod 110 is moved together when the pedal simulator 1200 is moved by the screw 1500.

The housing 1100 accommodates the pedal simulator 1200 and may be mounted on the dash panel. More specifically, the housing 1100 may include a cylindrical body portion 1110 and a mounting portion 1120 extending radially from one side of an outer circumferential surface of the body portion 1110. The body portion 1110 has a predetermined length and opposite sides thereof are formed to be penetrate in a longitudinal direction, so that an accommodation space 1112 is provided therein. The pedal simulator 1200 may be provided to reciprocate in the accommodation space 1112. An anti-rotation groove 1330 of the anti-rotation portion 1300, which will be described later, may be formed on an inner circumferential surface of the body portion 1110. The anti-rotation groove 1330 will be described again below.

The mounting portion 1120 is formed to extend from the outer circumferential surface of one side of the body portion 1110 so as to be integrally formed with the body portion 1110. The mounting portion 1120 may be formed in a plate shape and may be fixed to the dash panel by a plurality of fastening bolts 1121.

On the other hand, one side of the housing 1100 is provided with the pedal simulator 1200, and the other side of the hosing 1100 is coupled to the actuator housing 1600, which will be described later, to close the accommodation space 1112.

The pedal simulator 1200 is provided in the accommodation space 1112 to provide a reaction force according to the pedal effort of the brake pedal 100. The pedal simulator 1200 is shown in more detail in FIGS. 4 and 5.

Figure 4:
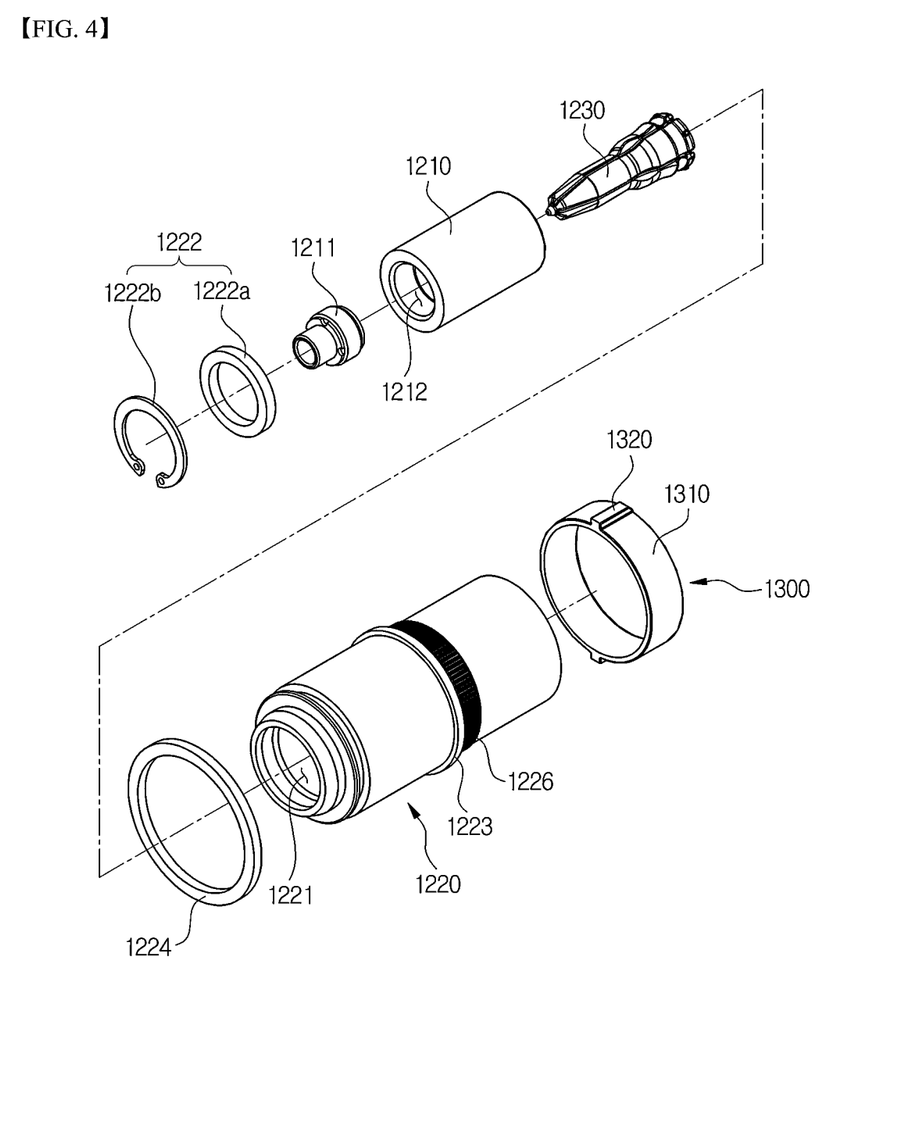
FIG. 4 is an exploded perspective view illustrating a pedal simulator provided in the apparatus for moving a brake pedal according to an exemplary embodiment of the present disclosure.
Figure 5:
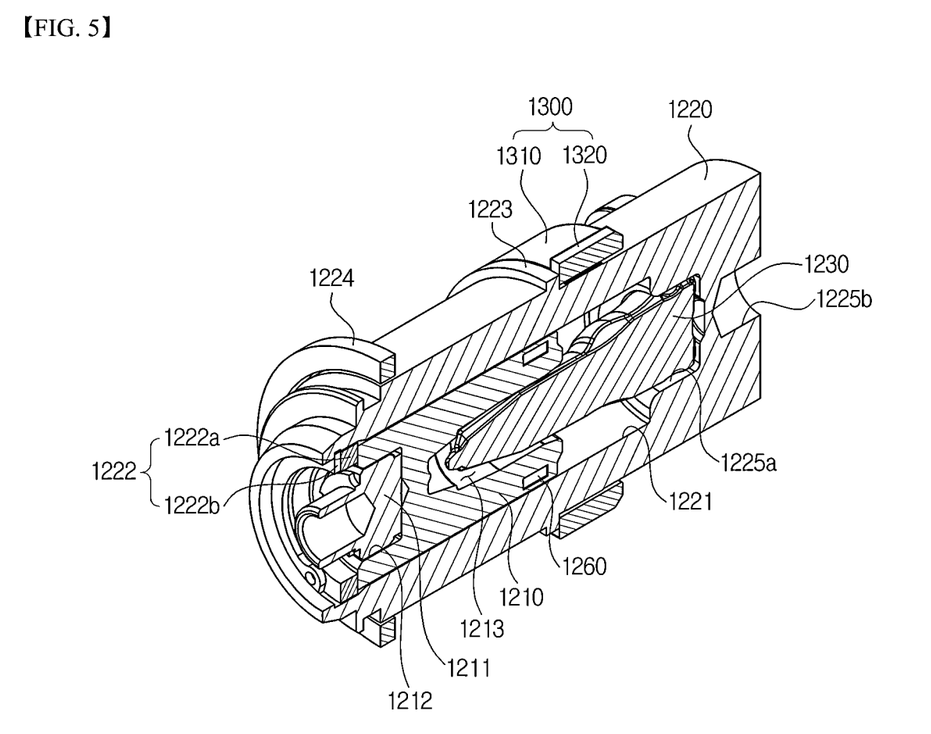
FIG. 5 is an assembled cross-sectional perspective view of FIG. 4.

FIG. 4 is an exploded perspective view illustrating a pedal simulator provided in an apparatus for moving a brake pedal according to an exemplary embodiment of the present disclosure, and FIG. 5 is an assembled cross-sectional perspective view of FIG. 4.

Referring to FIGS. 1 to 5, the pedal simulator 1200 may be provided to move forward and backward in the accommodation space 1112 of the housing 1100 by the screw 1500 to be described later, and apart from this, the pedal simulator 1200 may provide the pedal effort in a fixed state when the brake pedal 100 is operated. More specifically, the pedal simulator 1200 may include the reaction force piston 1210, a damping member 1230 and a reaction force spring 1250 that provide a reaction force, and a cylinder body supporting the reaction force spring 1250 and the damping member 1230.

The reaction force piston 1210 is slidably provided in a bore 1221 formed in a cylinder body 1220. As shown in the drawings, the reaction force piston 1210 is provided to directly receive the pedal effort of the brake pedal 100 through the input rod 110. The reaction force piston 1210 includes a press-fitting groove 1212 formed on one side thereof so that the plunger 1211 is press-fitted, and an insertion groove 1213 formed on the other side thereof so that one end of the damping member 1230 is inserted. Accordingly, when the reaction force piston 1210 is pressed by the pedal effort according to the brake pedal 100, the damping member 1230 supported on the cylinder body 1220 is pressed and elastically deformed by the reaction force piston 1210, thereby providing a reaction force.

The cylinder body 1220 may be provided slidably in a state in which rotation thereof is restricted in the accommodation space 1112. The bore 1221 is formed on one side of the cylinder body 1220 so that the reaction force piston 1210 may be accommodated therein and move forward and backward, and the screw 1500 to be described later may be fixed and coupled to the other side of the cylinder body 1220. Furthermore, the cylinder body 1220 may include a first coupling groove 1225a formed so that the damping member 1230 is fitted and fixed to a bottom of the bore 1221, and a second coupling groove 1225b formed so that one end of the screw 1500 is coupled to the other side of the cylinder body 1220. At this time, the reaction force piston 1210 and the damping member 1230, which are provided in the bore 1221 of the cylinder body 1220, may be disposed to be spaced apart from each other by a predetermined distance or disposed in contact with each other.

Furthermore, an anti-separation protrusion 1223 may be formed on the outer circumferential surface of the cylinder body 1220. The anti-separation protrusion 1223 serves to prevent the cylinder body 1220 from being separated from the accommodation space 1112 of the housing 1100 when the cylinder body 1220 is moved backward by the screw 1500 (a left direction based on FIG. 3). Accordingly, an anti-separation ring 1224 may be provided on the inner circumferential surface of one open side of the housing 1100 so as to restrict a movement distance of the cylinder body 1220. In other words, the anti-separation protrusion 1223 comes into contact with the separation prevention ring 1224, thereby preventing the cylinder body 1220 from being separated from the accommodation space 1112.

On the other hand, when the cylinder body 1220 is moved forward by the screw 1500 (a right direction based on FIG. 3), an anti-separation portion 1222 is further provided to move together with the reaction force piston 1210 provided in the bore 1221. The anti-separation portion 1222 prevents the reaction force piston 1210 from being separated from the bore 1221 of the cylinder body 1220, and as well as serves to cause the reaction force piston 1210 to move together when the cylinder body 1220 is moved by the screw 1500. The anti-separation portion 1222 includes a stopper ring 1222a installed on one side of the open bore 1221 of the cylinder body 1220 and a C-clip 1222b for supporting the stopper ring 1222a. Accordingly, when the cylinder body 1220 moves forward, the reaction force piston 1210 is supported by the stopper ring 1222a fixed by the C-clip 1222b to move together.

The reaction force spring 1250 serves to provide a reaction force according to the pedal effort of the brake pedal 100 together with the damping member 1230, and also serves to return the brake pedal 100 to its original position when the pedal effort of the brake pedal 100 is released. Accordingly, a retainer 1240 installed on the input rod 110 may further be provided so that the reaction force spring 1250 is stably installed to provide the pedal effort to the brake pedal 100.

The retainer 1240 is provided to face the cylinder body 1220, and may be spaced apart from the cylinder body 1220 by a predetermined distance and installed on the input rod 110. As a result, the retainer 1240 is provided to move together with the input rod 110. The reaction force spring 1250 is interposed between the retainer 1250 and the cylinder body 1220. The reaction force spring 1250 may be provided as a coil spring. As shown in the drawings, the reaction force spring 1250 has one end supported by the retainer 1240 and the other end supported by the cylinder body 1220 to provide a reaction force while compressed according to the pedal effort of the brake pedal 100.

Furthermore, a boot 150 may be provided to prevent foreign substances such as dust from entering the bore 1221 of the cylinder body 1220 or the housing 1100. The boot 150 may have one end installed on the retainer 1240 and the other end installed on the cylinder body 1220. The boot 150 is provided to be contractible and expandable according to the operation of the input rod 110.

When a reaction force according to the pedal effort of the brake pedal 100 is provided through the pedal simulator 1200 as described above, a braking force is generated by measuring the displacement of the brake pedal 100. In other words, by measuring the pedal effort of the brake pedal 100 and operating the hydraulic pressure supply device (not shown) through the measured, the required hydraulic pressure is provided to the wheel cylinders. Meanwhile, a magnet 1260 may be installed on the reaction force piston 1210, and a sensor 160 may be provided on an outer surface of the housing 1100. The sensor 160 may measure a displacement by detecting a magnetic force that is changed according to a position of the magnet 1260 moving together when the reaction force piston 1210 moves. Since the displacement measurement through the magnet 1260 and the sensor 160 is a well-known technique, a detailed description thereof will be omitted.

According to one aspect of the present disclosure, the screw 1500 coupled with the pedal simulator 1200 must be provided so that rotation thereof is restricted in order to convert a rotational motion into a linear motion. In other words, by preventing rotation of the pedal simulator 1200 through the anti-rotation portion 1300, the rotation of the screw 1500 coupled to the pedal simulator 1200 may be restricted. The anti-rotation portion 1300 is specifically illustrated in FIG. 6.

Figure 6:
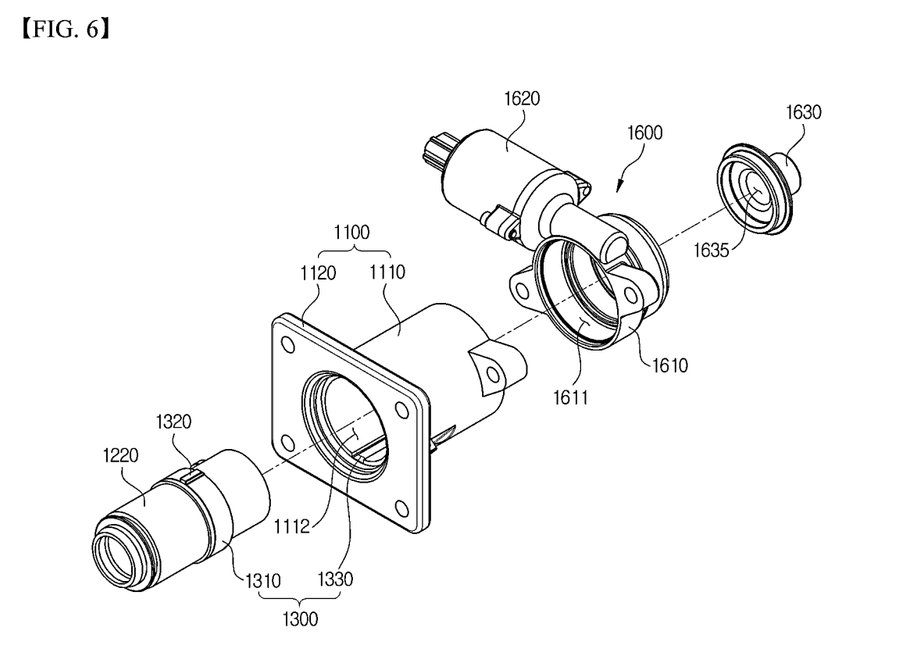
FIG. 6 is an exploded perspective view illustrating an anti-rotation portion and an actuator housing provided in the apparatus for moving a brake pedal according to an exemplary embodiment of the present disclosure.

FIG. 6 is an exploded perspective view illustrating the anti-rotation portion and the actuator housing, which are provided in the apparatus for moving the brake pedal according to an exemplary embodiment of the present disclosure.

Referring to FIGS. 2 to 6, the anti-rotation portion 1300 includes an anti-rotation body 1310 fixed to the outer circumferential surface of the cylinder body 1220, at least one anti-rotation protrusion 1320 protruding from the anti-rotation body 1310 along a moving direction of the screw 1500, and at least one anti-rotation groove 1330 that is recessed in a fixedly installed structure to allow the anti-rotation protrusion 1320 to be introduced.

The anti-rotation body 1310 is provided in a cylindrical shape with a hollow thereinside, and the cylinder body 1220 is fitted therein to be coupled thereto. At this time, the anti-rotation body 1310 may be firmly fixed to the cylinder body 1220 to move together with the cylinder body 1220, and may be coupled to a teeth portion 126 formed on the cylinder body 1220 to prevent rotation. For example, the teeth portion 1226 is provided along the outer circumferential surface of the cylinder body 1220, the inner circumferential surface of the anti-rotation body 1310 is cut by the teeth of the teeth portion 1226, so that the cylinder body 1220 and the anti-rotation body 1310 may be coupled. Such a coupling structure is not limited thereto as an exemplary embodiment.

The anti-rotation protrusion 1320 may be formed on the outer circumferential surface of the anti-rotation body 1310, and may be formed to protrude in forward and backward directions while preventing the rotation of the cylinder body 1220 so that the screw 1500 perform a linear motion without a rotational motion.

The anti-rotation groove 1330 may be recessed at a position opposite to the anti-rotation protrusion 1320 on a structure fixedly installed on a vehicle body. For example, the anti-rotation groove 1330 may be recessed inside the housing 1100. In addition, the anti-rotation groove 1330 is formed to extend from the inner circumferential surface of the housing 1100 in a longitudinal direction of the housing 1100, specifically, in a translation direction of the pedal simulator 1200 or the screw 1500. This is because the anti-rotation protrusion 1320 is introduced into the anti-rotation groove 1330 to prevent the screw 1500 from rotating, so that the cylinder body 1220 and the anti-rotation body 1310 move together when the screw 1500 is linearly moved. In other words, when the screw 1500 is linearly moved, the anti-rotation protrusion 1320 is guided along the anti-rotation groove 1330 to move. The anti-rotation grooves 1330 may be provided to correspond to the shape and number of the anti-rotation protrusions 1320.

The actuator 1400 is provided to generate and transmit power for the movements of the brake pedal 100 and the input rod 110. The actuator 1400 is shown in more detail in FIGS. 7 and 8.

Figure 7:
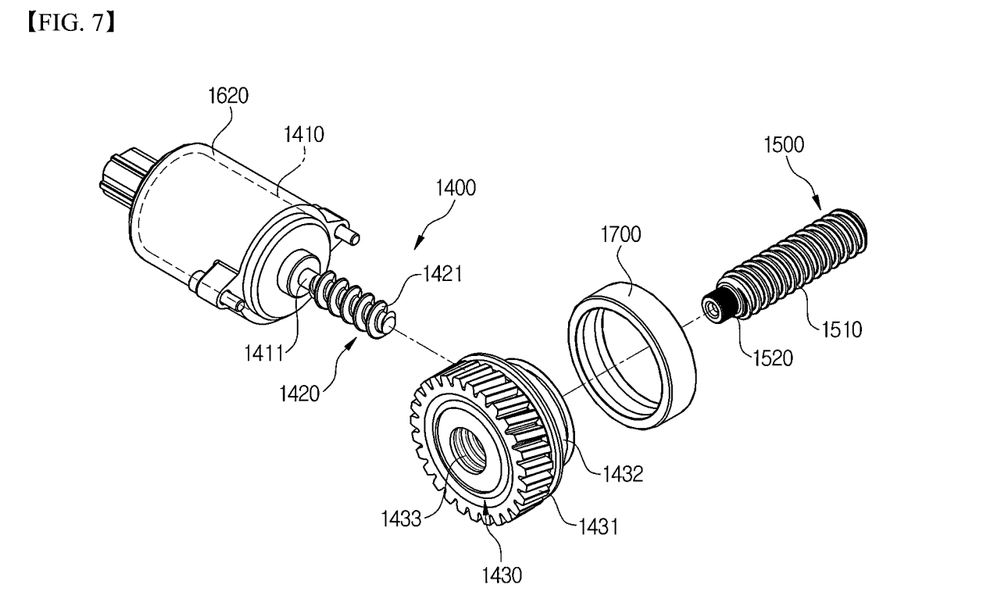
FIG. 7 is a partially exploded perspective view illustrating an actuator provided in the apparatus for moving a brake pedal according to an exemplary embodiment of the present disclosure.
Figure 8:
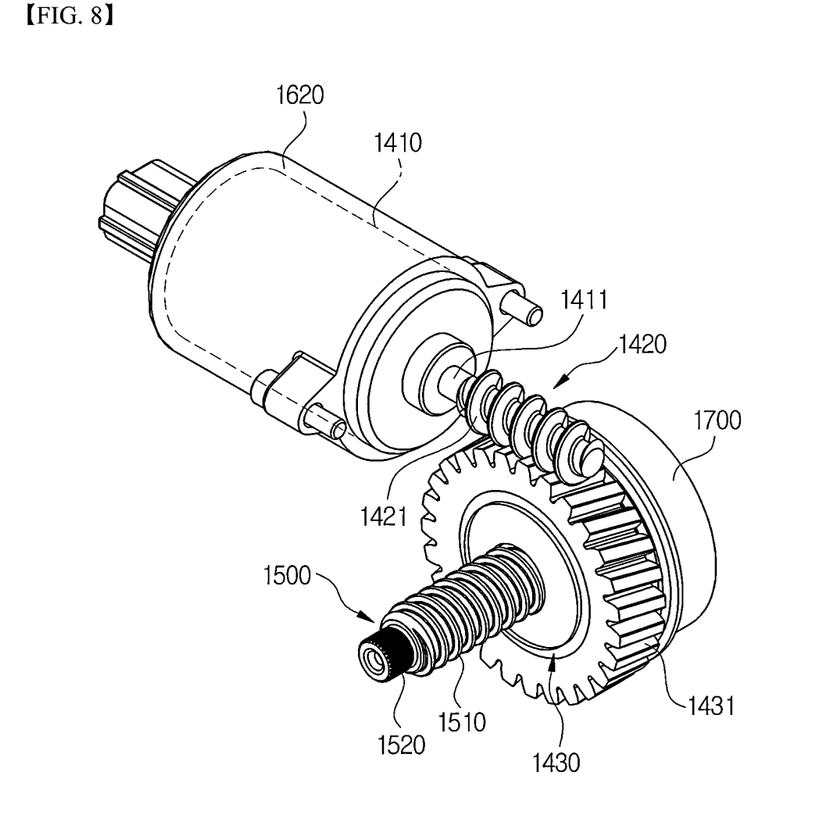
FIG. 8 is an assembled perspective view of FIG. 7.

FIG. 7 is a partially exploded perspective view illustrating the actuator provided in the apparatus for moving the brake pedal according to an exemplary embodiment of the present disclosure, and FIG. 8 is an assembled perspective view of FIG. 7.

Referring to FIGS. 3, 7 and 8, the actuator 1400 may include a motor 1410 that receives power from a battery (not shown) of the vehicle to generate power, and a gear assembly provided between a rotation shaft 1411 of the motor 1410 and the screw 1500 to transmit power.

The motor 1410 is provided with the rotation shaft 1411 for outputting a rotational force and is fixedly supported by the actuator housing 1600 to be described later. The motor 1410 may be provided as a bidirectional electric motor 1410 that performs forward and reverse rotation to implement forward and backward movement of the brake pedal 100. Furthermore, the motor 1410 may be automatically controlled according to an electrical signal transmitted from the electronic control unit, or may be controlled according to an electrical signal such as an operation signal transmitted by input from a driver.

The gear assembly may include a first gear 1420 connected to the rotation shaft 1411 of the motor 1410, and a second gear 1430 that is meshed with the first gear 1420 to transmit the rotational force to the screw 1500.

The first gear 1420 may be connected to the rotation shaft 1411 of the motor 1410 to transmit rotational force or power output from the motor 1410 to the second gear 1430. First gear teeth 1421 is formed on an outer circumferential surface of the first gear 1420. Furthermore, the first gear 1420 may rotate together coaxially with the rotation shaft 1411 of the motor 1410, and by machining gear teeth on the rotation shaft 1411, the rotation shaft 1411 may be formed as the first gear 1420.

The second gear 1430 is provided to receive the rotational force from the first gear 1420 to transmit the rotational force to the screw 1500. The second gear 1430 is provided with second gear teeth 1431 meshed with the first gear teeth 1421 on the outer circumferential surface. At this time, in order for the second gear 1430 receiving the rotational force from the first gear 1420 to transmit the rotational force to the screw 1500, a first screw thread 1510 is formed on the outer circumferential surface of the screw 1500 in a longitudinal direction. Furthermore, at the center of the second gear 1430, a second screw thread 1433 is formed on the inner circumferential surface to be screw-coupled coaxially with the screw 1500. Accordingly, the screw 1500 is coaxially connected to the second gear 1430 to receive the rotational force from the second gear 1430.

Meanwhile, the first gear 1420 is provided as a worm gear, and the second gear 1430 is provided as a worm wheel gear having the second screw thread 1433 formed on the inner circumferential surface thereof, so that the power transmitted from the motor 1410 may be provided to the screw 1500. Although the drawings show that the first and second gears 1420 and 1430 are adapted as a worm gear and a worm wheel gear, this is only an example for helping understanding of the disclosure and is not limited to the corresponding gear structure.

The screw 1500 has a predetermined length, and the first screw thread 1510 is formed on the outer circumferential surface thereof in a longitudinal direction. A coupling portion 1520 coupled and fixed to the second coupling groove 1225b of the cylinder body 1220 is provided at one end of the screw 1500. Because the coupling portion 1520 has teeth or spline, when the coupling portion 1520 is coupled to the second coupling groove 1225b, the outer surface of the second coupling groove 1225b is cut by the teeth, so that the screw 1500 and the cylinder body 1220 are coupled and fixed to each other. As a result, because the screw 1500 received the rotational force from the second gear 1430 is coupled to the cylinder body 1220 whose rotation is restricted, the rotation of the screw 1500 is restricted and the rotational force is converted into linear motion, the screw 1500 may slide in an axial direction.

On the other hand, in order for the second gear 1430 to receive the rotational force from the first gear 1420 to stably transmit the rotational force to the screw 1500, the second gear 1430 may be supported by a bearing 1700. The bearing 1700 may be interposed between the second gear 1430 and the actuator housing 1600 to be described later. To this end, the second gear 1430 may include an extension 1432 extending in an axial direction from the second gear 1430 so that the bearing 1700 is easily mounted. The extension 1432 may have a hollow shape in the center thereof to avoid interference with the screw 1500 moving linearly.

The actuator housing 1600 for supporting the actuator 1400 as described above is coupled to the housing 1100 fixed to the dash panel. More specifically, referring to FIGS. 2 and 6, the actuator housing 1600 may include a first housing 1610 accommodating the first and second gears 1420 and 1430 and a screw 1500, a second housing 1620 accommodating the motor 1410, and a cover 1630.

The first housing 1610 has a gear accommodating portion 1611 therein and is coupled to the other side of the body portion 1110 of the housing 1100. At this time, to connect the pedal simulator 1200 provided in the housing 1100 and the screw 1500 provided in the first housing 1610, the accommodation space 1112 and the gear accommodating portion 1611 are provided to communicate with each other. In other words, the first housing 1610 may be provided with opposite sides open. As a result, the first gear 1420, the second gear 1430, and the screw 1500 of the gear assembly are accommodated in the first housing 1610, and the bearing 1700 is interposed between the extension 1432 of the second gear 1430 and the first housing 1610 to allow the second gear 1430 to be rotated smoothly.

The second housing 1620 accommodates the motor 1410 and is coupled to the first housing 1610. At this time, the rotation shaft 1411 of the motor 1410 may be coupled to face the gear accommodating portion 1611 of the first housing 1610.

The cover 1630 is coupled to the opposite side of the first housing 1610 coupled to the body portion 1110 to seal the gear accommodating portion 1611. The cover 1630 has a receiving portion 1635 formed in an axial direction so that at least a part of the screw 1500 is introduced into and received during translation of the screw 1500.

Hereinafter, an operation of the apparatus for moving the brake pedal according to an exemplary embodiment will be described.

Figure 9:
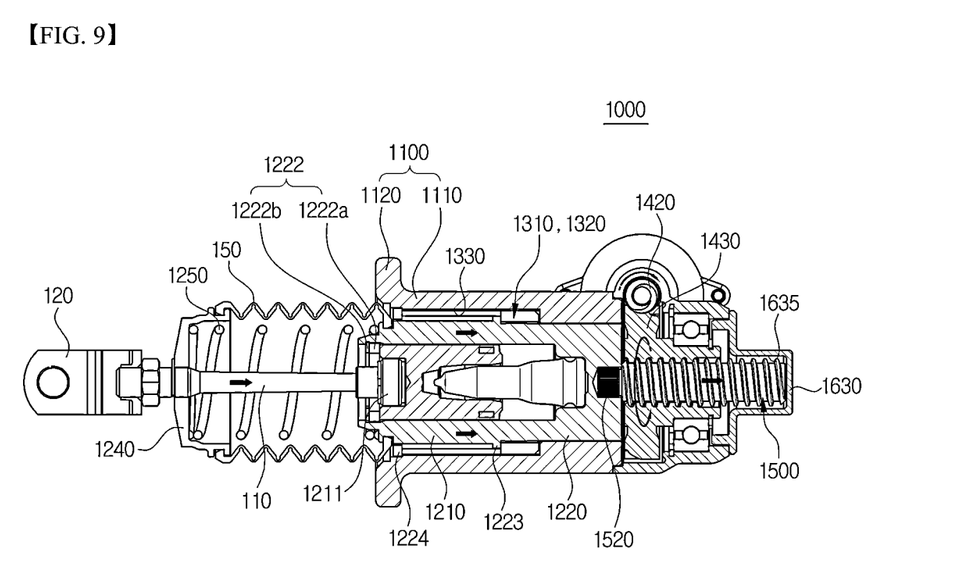
FIG. 9 is a side cross-sectional view illustrating a state in which a brake pedal is received from a passenger space (a forward state) by the apparatus for moving a brake pedal according to an exemplary embodiment of the present disclosure.

FIG. 9 is a side cross-sectional view illustrating a state in which the brake pedal is received from the passenger space (a forward state) by the apparatus for moving the brake pedal according to an exemplary embodiment of the present disclosure.

Referring to FIG. 9, to accommodate or move forward (a right direction based on FIG. 9) the brake pedal 100 during autonomous driving of the vehicle or at the request of a driver, the electronic control unit transmits an electrical signal to allow the rotation shaft 1411 of the motor 1410 to rotate in one direction (clockwise). As a result, the first gear 1420 connected to the rotation shaft 1411 of the motor 1410 rotates together, and accordingly, the second gear 1430 also rotates together. The rotational force or power of the second gear 1430 is transmitted to the screw 1500 screw-coupled to the center of the second gear 1430. At this time, because the screw 1500 is coupled with the cylinder body 1220 of the pedal simulator 1200 whose rotation is restricted by the anti-rotation portion 1300, the rotation of the screw 1500 is restricted, leading to advancing. At this time, the screw 1500 moves toward the receiving portion 1635 of the cover 1630, and as the cylinder body 1220 coupled with the screw 1500 moves together, the reaction force piston 1210, the input rod 110 connected to the reaction force piston 1210, and the brake pedal 100 connected to the input rod 110 advance together, resulting in received from the passenger space of the vehicle.

Hereinafter, an operating state in which the brake pedal is exposed to the passenger space and operated will be described.

Figure 10:
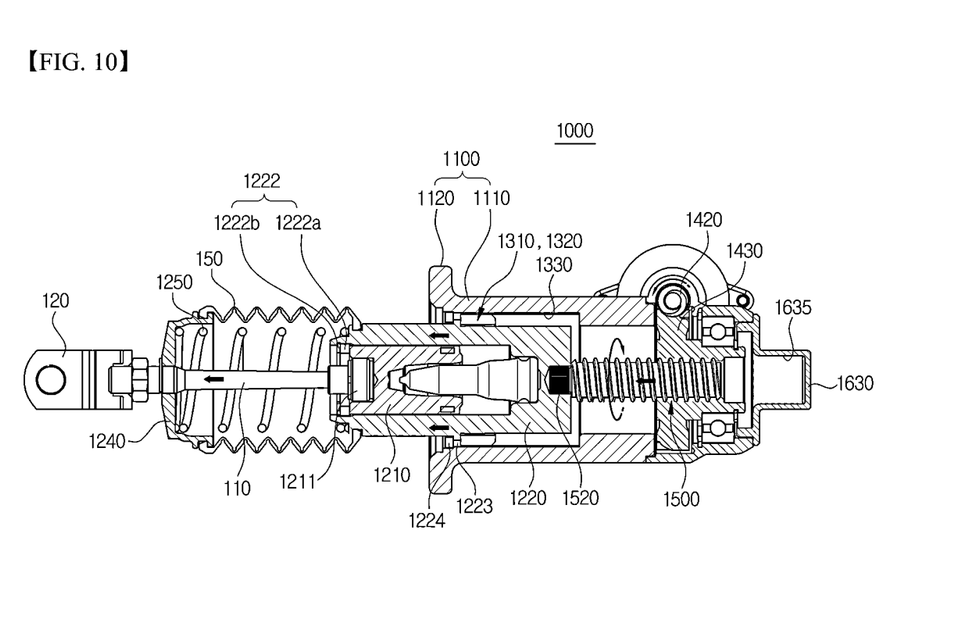
FIG. 10 is a side cross-sectional view illustrating a state in which the brake pedal is exposed to the passenger space (a backward state) by the apparatus for moving a brake pedal according to an exemplary embodiment of the present disclosure.

FIG. 10 is a side cross-sectional view illustrating a state in which the brake pedal is exposed to the passenger space (a backward state) by the apparatus for moving the brake pedal according to an exemplary embodiment of the present disclosure.

Referring to FIG. 10, when the autonomous driving of the vehicle is terminated or a braking operation is performed by a driver's request, the brake pedal 100 is exposed or moved backward (a left direction based on FIG. 10). In other words, an electric signal is transmitted through the electronic control unit to rotate the rotation shaft 1411 of the motor 1410 in the other direction (counterclockwise). As a result, the first gear 1420 connected to the rotation shaft 1411 of the motor 1410 rotates together, and accordingly, the second gear 1430 also rotates together. The rotational force or power of the second gear 1430 is transmitted to the screw-coupled screw 1500, and because the cylinder body 1220 whose rotation is restricted by the anti-rotation portion 1300 is coupled with the screw 1500, the screw 1500 moves backward resulting in returning to its original position. Furthermore, as the cylinder body 1220 moves, the reaction force piston 1210, the input rod 110, and the brake pedal 100 move backward together, resulting in exposed to the passenger space of the vehicle.

An operating state in which the driver performs braking while the brake pedal is exposed to the passenger space of the vehicle will be described with reference to FIG. 11.

Figure 11:
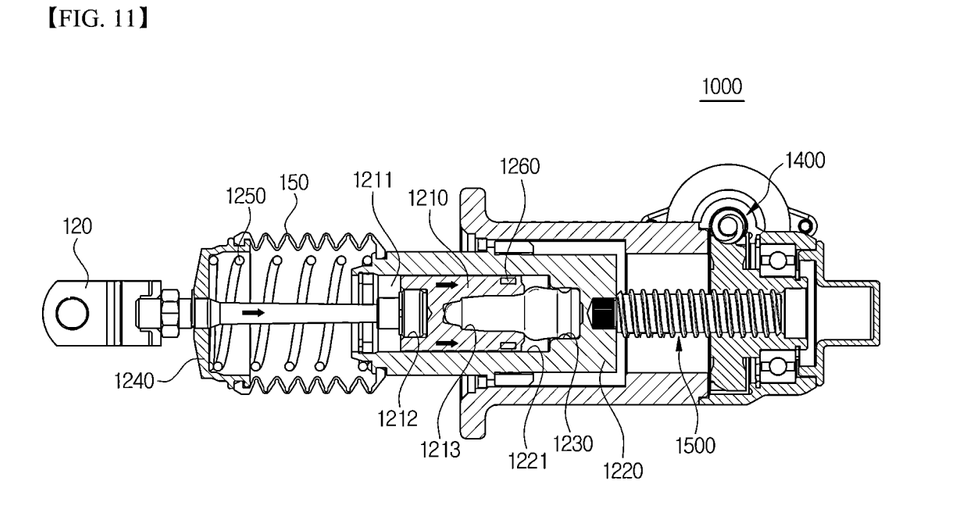
FIG. 11 is a side cross-sectional view illustrating the brake pedal being operated in a state in which the brake pedal is exposed to the passenger space by the apparatus for moving a brake pedal according to an exemplary embodiment of the present disclosure.

Referring to FIG. 11, as the driver applies the pedal effort to the brake pedal 100, the input rod 110 and the reaction force piston 1210 connected to the input rod 110 are pressed and moved forward together. At this time, as the retainer 1240 installed on the input rod 110 moves together, the reaction force spring 1250 supported by the retainer 1240 is compressed. In other words, the pedal effort is provided to the driver by the elastic restoring force generated as the reaction force spring 1250 is compressed. Furthermore, the reaction force piston 1210 presses the damping member 1230 supported on the cylinder body 1220 to elastically deform the damping member 1230, thereby providing a secondary pedal effort. At this time, because the other end of the cylinder body 1220 is coupled by the screw 1500 and the screw 1500 is screw-coupled with the second gear 1430, the linear motion of the cylinder body 1220 is restricted.

On the other hand, when the reaction force piston 1210 is pressed so as to elastically deform the damping member 1230, the magnet 1260 provided in the reaction force piston 1210 moves together. The sensor 160 provided on the outer side of the housing 1100 detects a change in magnetic force of the magnet 1260 due to the movement of the magnet, thereby measuring the displacement of the reaction force piston 1210, that is, the brake pedal 100. Accordingly, the electronic control unit receives the driver's braking intention as an electrical signal by measuring the displacement of the reaction force piston 1210 pressed according to the pedal effort of the brake pedal 100 through the sensor 160, and based on the electrical signal, operates the hydraulic pressure supply device to supply hydraulic pressure required for braking to the wheel cylinders, thereby implementing braking.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. An apparatus for moving a brake pedal, the apparatus comprising:
    an input rod coupled with a brake pedal at a backward end and coupled with a reaction force piston of a pedal simulator at a forward end;
    the pedal simulator providing a reaction force according to a pedal effort of the brake pedal;
    an actuator configured to provide power;
    a screw fixed to a forward side of the pedal simulator and having a first screw thread formed on an outer circumferential surface thereof and configured to displace the pedal simulator by performing a translational motion according to the power of the actuator;
    an anti-rotation portion configured to prevent rotation of the pedal simulator and the screw; and
    wherein the forward end of the input rod is coupled with the reaction force piston such that the displacement of the reaction force piston in a forward direction generates the translational motion of the input rod and the brake pedal in the forward direction;

wherein the first screw thread is connected to the actuator to receive a force, wherein the screw, by converting the rotational force into the translational motion by the anti-rotation portion, is configured to generate the translational motion of the pedal simulator in the forward direction, which causes the translational motion of the input rod and the brake pedal in the forward direction.

2. The apparatus of claim 1, wherein the pedal simulator further comprises:
a cylinder body in which an open bore is formed on a backward side and the screw is fixed on a forward side thereof, the bore in which the reaction force piston is accommodated to move forward and backward.

3. The apparatus of claim 2, further comprising an anti-separation portion installed on a backward end of the open bore of the cylinder body such that, when the cylinder body moves by the screw in the forward direction, the anti-separation portion supports the reaction force piston, thereby causing the reaction forced piston to move together with the cylinder body in the forward direction.

4. The apparatus of claim 2, wherein the anti-rotation portion further comprises:
an anti-rotation body fixed to the cylinder body;
at least one anti-rotation protrusion protruding from the anti-rotation body; and
at least one anti-rotation groove that is recessed in a fixedly installed structure to allow the anti-rotation protrusion to be introduced.

5. The apparatus of claim 4, wherein
the anti-rotation body is provided in a cylindrical shape and fixed to an outer circumferential surface of the cylinder body, and
the anti-rotation protrusion is provided on an outer circumferential surface of the anti-rotation body.

6. The apparatus of claim 4, wherein
the anti-rotation groove is configured to extend along a translational movement direction.

7. The apparatus of claim 4, wherein
the actuator further comprises:
a motor configured to generate power, and
a gear assembly provided between a rotation shaft of the motor and the screw.

8. The apparatus of claim 7, wherein
the gear assembly further comprises:
a first gear coupled to the rotation shaft of the motor, and
a second gear meshed with the first gear to transmit a rotational force to the screw.

9. The apparatus of claim 8, wherein
the second gear is provided coaxially with the screw, and includes a second screw thread meshing with the first screw thread on an inner circumferential surface thereof.

10. The apparatus of claim 9, wherein
the first gear is provided as a worm gear, and
the second gear is provided as a worm wheel gear.

11. The apparatus of claim 9, wherein
the first gear includes first gear teeth on an outer circumferential surface thereof, and
the second gear includes second gear teeth meshing with the first gear teeth on an outer circumferential surface thereof.

12. The apparatus of claim 7, further comprising a housing having an accommodation space therein and fixed to a dash panel of a vehicle,
wherein the anti-rotation groove is recessed in the housing.

13. The apparatus of claim 12, wherein
the housing further comprises:
a cylindrical body portion through which opposite sides thereof are penetrated so that the pedal simulator moves forward and backward in a longitudinal direction in the accommodation space, and
a mounting portion extending radially from one side of an outer circumferential surface of the body portion and fixed to the dash panel.

14. The apparatus of claim 13, further comprising an actuator housing coupled to the other side of the body portion,
wherein the actuator housing comprises:
a first housing accommodating the gear assembly and provided with a gear accommodating portion communicating with the accommodation space,
a second housing accommodating the motor and coupled to the first housing, and
a cover coupled to the first housing and sealing the gear accommodating portion.

15. The apparatus of claim 14, wherein
the cover includes a receiving portion formed in an axial direction to receive at least a portion of the screw during translation of the screw.

16. The apparatus of claim 1, wherein
the actuator is configured to be automatically controlled by an electronic control unit of a vehicle, or be controlled by receiving an operation signal from a driver.

* * * * *